(12) United States Patent
Lerner

(10) Patent No.: US 10,764,282 B2
(45) Date of Patent: *Sep. 1, 2020

(54) PROTECTED AND SECURED USER-WEARABLE DEVICES FOR ASSURED AUTHENTICATION AND VALIDATION OF DATA STORAGE AND TRANSMISSION THAT UTILIZE SECURITIZED CONTAINERS

(71) Applicant: Daniel Maurice Lerner, Missouri City, TX (US)

(72) Inventor: Daniel Maurice Lerner, Missouri City, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/222,684

(22) Filed: Dec. 17, 2018

(65) Prior Publication Data

US 2019/0268772 A1 Aug. 29, 2019

Related U.S. Application Data

(63) Continuation of application No. 16/173,179, filed on Oct. 29, 2018, now Pat. No. 10,616,192, which is a
(Continued)

(51) Int. Cl.
*H04L 29/06* (2006.01)
*H04W 12/06* (2009.01)
(Continued)

(52) U.S. Cl.
CPC .......... *H04L 63/0861* (2013.01); *G06F 1/163* (2013.01); *H04L 9/0866* (2013.01);
(Continued)

(58) Field of Classification Search
CPC .................................................. H04L 63/0861
See application file for complete search history.

(56) References Cited

U.S. PATENT DOCUMENTS

| 4,200,770 A | 4/1980 | Hellman et al. |
| 4,218,582 A | 8/1980 | Hellman et al. |

(Continued)

FOREIGN PATENT DOCUMENTS

| KR | 20160104625 A | 9/2016 |
| WO | 2017/111843 A1 | 6/2016 |

OTHER PUBLICATIONS

Krivtsova, E. International Search Report. Federal Institute of Industrial Property. ISA/RU. Form PCT/ISA/210. Box A-C. Apr. 18, 2019, Moscow, Russia.
(Continued)

*Primary Examiner* — Bradley W Holder
(74) *Attorney, Agent, or Firm* — ePatentManager.com; Guerry Grune

(57) ABSTRACT

Described are user-wearable devices utilizing encryption authentication techniques to ensure security of any data transmission to and from these devices that utilize one or more securitized containers. The securitized containers can be software containers that are either real or virtual devices. The user-wearable devices communicate using digital signals transmitted and received via wireless, optical, radiative, and other forms of energy that can be converted into signals. In order to provide privacy and security of these signals, unique encryption technology is employed together with the use of biometrics associated with each user. Such devices include timepieces such as digital watches that perform functions suitable for user-wearable devices. The devices can establish communications with a counterpart communication device or system in order to provide the ability to perform specific secured transactions. The biometric data transceivers are capable of reading a user's encrypted biometric data and then transmitting the encrypted data to a user identity validation distributed auto-synchronous array (DASA) database which allows for decryption, identifica-
(Continued)

tion, and authentication of both the user(s) and the transaction(s).

27 Claims, 7 Drawing Sheets

Related U.S. Application Data continuation of application No. 16/005,871, filed on Jun. 12, 2018, now Pat. No. 10,171,435, which is a continuation-in-part of application No. 16/005,040, filed on Jun. 11, 2018, now Pat. No. 10,154,021, application No. 16/222,684, which is a continuation-in-part of application No. 16/173,091, filed on Oct. 29, 2018, now Pat. No. 10,601,805, and a continuation of application No. 16/173,258, filed on Oct. 29, 2018, which is a continuation of application No. 16/005,918, filed on Jun. 12, 2018, now Pat. No. 10,154,016, said application No. 16/173,091 is a continuation of application No. 16/005,040, filed on Jun. 11, 2018, now Pat. No. 10,154,021, application No. 16/222,684, which is a continuation of application No. 16/202,905, filed on Nov. 28, 2018, now Pat. No. 10,645,070, which is a continuation of application No. 16/005,134, filed on Jun. 11, 2018, now Pat. No. 10,171,444, application No. 16/222,684, filed on Dec. 17, 2018, which is a continuation of application No. 16/221,041, filed on Dec. 14, 2018, now Pat. No. 10,579,793, application No. 16/222,684, which is a continuation of application No. 16/222,421, filed on Dec. 17, 2018, now Pat. No. 10,650,139, application No. 16/222,684, which is a continuation of application No. 16/173,384, filed on Oct. 29, 2018, now Pat. No. 10,623,384, which is a continuation of application No. 16/006,011, filed on Jun. 12, 2018, now Pat. No. 10,158,613, which is a continuation-in-part of application No. 16/005,040, filed on Jun. 11, 2018, now Pat. No. 10,154,021, application No. 16/222,684, which is a continuation of application No. 16/173,323, filed on Oct. 29, 2018, which is a continuation of application No. 16/005,968, filed on Jun. 12, 2018, now Pat. No. 10,154,015, which is a continuation-in-part of application No. 16/005,040, filed on Jun. 11, 2018, now Pat. No. 10,154,021, application No. 16/222,684, which is a continuation of application No. 16/178,295, filed on Nov. 1, 2018.

(60) Provisional application No. 62/540,266, filed on Aug. 2, 2017, provisional application No. 62/518,281, filed on Jun. 12, 2017, provisional application No. 62/610,827, filed on Dec. 27, 2017, provisional application No. 62/652,709, filed on Apr. 4, 2018, provisional application No. 62/652,737, filed on Apr. 4, 2018, provisional application No. 62/540,352, filed on Aug. 2, 2017, provisional application No. 62/518,337, filed on Jun. 12, 2017.

(51) Int. Cl.
*H04L 9/32* (2006.01)
*H04W 12/00* (2009.01)
*H04L 9/14* (2006.01)
*H04L 9/08* (2006.01)
*G06F 1/16* (2006.01)

(52) U.S. Cl.
CPC .............. *H04L 9/14* (2013.01); *H04L 9/3231* (2013.01); *H04L 9/3271* (2013.01); *H04W 12/0013* (2019.01); *H04W 12/00409* (2019.01); *H04W 12/0605* (2019.01); *H04L 2209/805* (2013.01)

(56) References Cited

U.S. PATENT DOCUMENTS

| | | |
|---|---|---|
| 4,405,829 A | 9/1983 | Rivest et al. |
| 4,424,414 A | 1/1984 | Hellmn et al. |
| 4,578,530 A | 3/1986 | Zeidler |
| 5,214,703 A | 5/1993 | Massey et al. |
| 5,227,613 A * | 7/1993 | Takagi ............... G06K 7/0008 235/380 |
| 5,675,653 A | 10/1997 | Nelson, Jr. |
| 5,825,890 A | 10/1998 | Elgamal et al. |
| 6,154,636 A * | 11/2000 | Wright ............... H04B 7/18506 340/517 |
| 6,157,722 A | 12/2000 | Lerner et al. |
| 6,160,998 A * | 12/2000 | Wright ............... H04B 7/18506 340/945 |
| 6,466,780 B1 | 10/2002 | Geiselman et al. |
| 6,522,867 B1 * | 2/2003 | Wright ............... G05D 1/0055 340/945 |
| 6,766,161 B2 | 7/2004 | Geiselman et al. |
| 6,959,086 B2 | 10/2005 | Ober et al. |
| 7,181,016 B2 | 2/2007 | Cross et al. |
| 7,382,883 B2 | 6/2008 | Cross et al. |
| 8,205,091 B2 * | 6/2012 | Buckley ............... H04L 9/3271 713/182 |
| 8,462,955 B2 | 6/2013 | Ureche et al. |
| 8,825,999 B2 | 9/2014 | Mohamed |
| 9,094,191 B2 | 7/2015 | Avanzi et al. |
| 9,213,858 B2 | 12/2015 | Sharma et al. |
| 9,465,953 B2 | 10/2016 | Shasrma et al. |
| 9,521,123 B2 | 12/2016 | Jueneman et al. |
| 9,600,676 B1 * | 3/2017 | Farmer ............... H04L 9/3271 |
| 9,703,985 B1 | 7/2017 | Sanchez |
| 9,900,287 B1 * | 2/2018 | Jooste ............... H04L 63/0428 |
| 10,122,766 B2 | 11/2018 | Viswnathan et al. |
| 2005/0076198 A1 * | 4/2005 | Skomra ............... H04L 9/321 713/156 |
| 2005/0228986 A1 * | 10/2005 | Fukasawa ............. H04L 9/0891 713/156 |
| 2011/0107086 A1 * | 5/2011 | Soliman ............... H04L 9/0822 713/155 |
| 2011/0110364 A1 * | 5/2011 | Fried ............... G06Q 30/02 370/352 |
| 2011/0112901 A1 * | 5/2011 | Fried ............... G06Q 30/02 705/14.49 |
| 2012/0198538 A1 | 8/2012 | Spring et al. |
| 2013/0332025 A1 * | 12/2013 | Ziarno ............... G05B 23/0213 701/33.4 |
| 2014/0085050 A1 * | 3/2014 | Luna ............... G07C 9/37 340/5.82 |
| 2014/0279528 A1 * | 9/2014 | Slaby ............... H04L 63/0853 705/44 |
| 2014/0282153 A1 * | 9/2014 | Christiansen ...... G06Q 30/0201 715/765 |
| 2014/0337621 A1 * | 11/2014 | Nakhimov ............. G06F 1/163 713/168 |
| 2015/0169882 A1 * | 6/2015 | Saxena ............... G06F 21/36 726/17 |
| 2016/0294794 A1 * | 10/2016 | Mancic ............... H04L 63/061 |
| 2016/0315974 A1 | 10/2016 | Viswanathan et al. |
| 2016/0337328 A1 * | 11/2016 | Sallam ............... H04L 63/0861 |
| 2017/0012642 A1 | 1/2017 | Declercq et al. |
| 2017/0118207 A1 * | 4/2017 | Madhu ............... G06K 9/00906 |

OTHER PUBLICATIONS

Krivtsova, E. Written Opinion of the International Searching Authority. Federal Institute of Industrial Property. ISA/RU. Form PCT/IS/

(56) References Cited

OTHER PUBLICATIONS

237. Box No. V and Supplemental Box. Apr. 18, 2019, Moscow, Russia.

* cited by examiner

PROTECTED AND SECURED USER-WEARABLE DEVICES FOR ASSURED AUTHENTICATION AND VALIDATION OF DATA STORAGE AND TRANSMISSION THAT UTILIZE SECURITIZED CONTAINERS

PRIORITY STATEMENT

This application is a nonprovisional conversion of and takes priority under 119(e) of U.S. Provisional Application No. 62/652,737, filed Apr. 4, 2018 and entitled, "User-Wearable Secured Devices Provided with Encryption Assuring Authentication and Validation of Data Storage and Transmission That Utilize Securitized Containers".

This application is also a continuation of U.S. Nonprovisional application Ser. No. 16/221,041 filed Dec. 14, 2018 and entitled, "Managed Securitized Containers and Container Communications", which is a nonprovisional conversion of U.S. Provisional Application number U.S. Provisional Application No. 62/610,827, entitled "Managed Securitized and Encrypted Containers and Container Communications", filed Dec. 27, 2017.

This application is also a continuation of U.S. application Ser. No. 16/173,091 filed Oct. 29, 2018, which is a continuation of U.S. Nonprovisional application Ser. No. 16/005,040 filed Jun. 11, 2018 entitled "Securitization of Temporal Digital Communications with Authentication and Validation of User and Access Devices", granted as U.S. Pat. No. 10,154,021 on Dec. 11, 2018, which is a nonprovisional conversion of U.S. Provisional Application entitled "A System for Securing and Encrypting Temporal Digital Communications with Authentication and Validation of User and Access Devices" with Ser. No. 62/518,281 filed Jun. 12, 2017.

This application is also a continuation of U.S. Nonprovisional application Ser. No. 16/202,905, filed Nov. 28, 2018 which is a continuation of U.S. Nonprovisional application Ser. No. 16/005,134, filed Jun. 11, 2018, granted as U.S. Pat. No. 10,171,444 on Jan. 1, 2019, and entitled "Securitization of Temporal Digital Communications with Authentication and Validation of User and Access Devices" which is a nonprovisional conversion of U.S. Provisional Application entitled "Securitizing Temporal Digital Communications Via Authentication and Validation for Wireless User and Access Devices" with Ser. No. 62/518,337, filed Jun. 12, 2017.

Further, application Ser. No. 16/005,134, filed Jun. 12, 2018, granted as U.S. Pat. No. 10,171,444 on Jan. 1, 2018, is a continuation-in-part of U.S. Nonprovisional application Ser. No. 16/005,040 filed Jun. 11, 2018 entitled "Securitization of Temporal Digital Communications with Authentication and Validation of User and Access Devices", granted as U.S. Pat. No. 10,154,021 on Dec. 11, 2018.

This application is also a continuation of U.S. Nonprovisional application Ser. No. 16/178,295, filed Nov. 2, 2018, which is a continuation of U.S. Nonprovisional application Ser. No. 16/005,281 filed Jun. 11, 2018 and entitled, "User-Wearable Secured Devices Provided Assuring Authentication and Validation of Data Storage and Transmission", which is a nonprovisional conversion of 62/518,371, filed Jun. 12, 2017 and entitled, "User-Wearable Secured Devices Provided with Encryption Assuring Authentication and validation of Data Storage and Transmission".

Further, application Ser. No. 16/005,281, filed Jun. 11, 2018, granted as U.S. Pat. No. 10,154,031 on Dec. 11, 2018, is a continuation-in-part of U.S. Nonprovisional application Ser. No. 16/005,040 filed Jun. 11, 2018 entitled "Securitization of Temporal Digital Communications with Authentication and Validation of User and Access Devices", granted as U.S. Pat. No. 10,154,021 on Dec. 11, 2018.

This application is also a continuation of U.S. Nonprovisional application Ser. No. 16/173,179, filed Oct. 29, 2018, which is a continuation of U.S. Nonprovisional application Ser. No. 16/005,871, filed Jun. 12, 2018 and entitled, "Devices that Utilize Random Tokens Which Direct Dynamic Random Access," which is a nonprovisional conversion of U.S. Provisional Application No. 62/540,266, filed Aug. 2, 2017 and entitled, "Selectable Key and Key Locator for A Hidden Dynamic Random Access Encryption System".

Further, application Ser. No. 16/005,871, filed Jun. 12, 2018, granted as U.S. Pat. No. 10,171,435 on Jan. 1, 2019, is a continuation-in-part of U.S. Nonprovisional application Ser. No. 16/005,040 filed Jun. 11, 2018 entitled "Securitization of Temporal Digital Communications with Authentication and Validation of User and Access Devices", granted as U.S. Pat. No. 10,154,021 on Dec. 11, 2018.

This application is also a continuation of U.S. Nonprovisional application Ser. No. 16/173,258, filed Oct. 29, 2018, which is a continuation of U.S. Nonprovisional application Ser. No. 16/005,918 filed Jun. 12, 2018, granted as U.S. Pat. No. 10,154,016 on Dec. 11, 2018, and entitled, "Devices for Transmitting and Communicating Randomized Data Utilizing Sub-Channels", which is a nonprovisional conversion of U.S. Provisional Application No. 62/540,307 filed Aug. 2, 2017 and entitled, "Devices for Transmitting and Communicating Randomized Encrypted Data Utilizing Sub-Channels".

Further, application Ser. No. 16/005,918, filed Jun. 12, 2018, granted as U.S. Pat. No. 10,154,016 on Dec. 11, 2018, is a continuation-in-part of U.S. Nonprovisional application Ser. No. 16/005,040 filed Jun. 11, 2018 entitled "Securitization of Temporal Digital Communications with Authentication and Validation of User and Access Devices", granted as U.S. Pat. No. 10,154,021 on Dec. 11, 2018.

This application is also a continuation of U.S. Nonprovisional application Ser. No. 16/173,323, filed Oct. 29, 2018, which is continuation of U.S. Nonprovisional application Ser. No. 16/005,968 filed Jun. 12, 2018, granted as U.S. Pat. No. 10,154,015 on Dec. 11, 2018, and entitled, "Executable Coded Cipher Keys", which is a nonprovisional conversion of U.S. Provisional Application No. 62/540,326 filed Aug. 2, 2017 and entitled, "Executable Coded Cipher Keys".

Further, application Ser. No. 16/005,968, filed Jun. 12, 2018, granted as U.S. Pat. No. 10,154,015 on Dec. 11, 2018, is a continuation-in-part of U.S. Nonprovisional application Ser. No. 16/005,040 filed Jun. 11, 2018 entitled "Securitization of Temporal Digital Communications with Authentication and Validation of User and Access Devices", granted as U.S. Pat. No. 10,154,021 on Dec. 11, 2018.

In addition, this application is also a continuation of and takes priority under 35 USC § 120 of U.S. patent application Ser. No. 16/173,384, filed Oct. 29, 2018, which is a continuation of application Ser. No. 16/006,011, filed Jun. 12, 2018, granted as U.S. Pat. No. 10,158,613 on Dec. 18, 2018, which is a nonprovisional conversion of and takes priority under 119(e) of U.S. Provisional Application No. 62/540,352, entitled "Combined Hidden Dynamic Random Access Devices and Encryption Systems Utilizing Selectable Keys and Key Locators for Communicating Randomized Encrypted Data Together with Sub-Channels and Executable Coded Encryption Keys", filed Aug. 2, 2017.

Further, application Ser. No. 16/006,011, filed Jun. 12, 2018, granted as U.S. Pat. No. 10,158,613 on Dec. 18, 2018, is a continuation-in-part of U.S. Nonprovisional application Ser. No. 16/005,040 filed Jun. 11, 2018 entitled "Securitization of Temporal Digital Communications with Authentication and Validation of User and Access Devices", granted as U.S. Pat. No. 10,154,021 on Dec. 11, 2018.

This application is also a continuation of U.S. Nonprovisional application Ser. No. 16/222,421 filed Dec. 17, 2018 and entitled "Securing Temporal Digital Communications With Authentication and Validation for Wireless User and Access Devices for Securitized Containers" which is a nonprovisional conversion of U.S. Provisional Application entitled "Securitizing Temporal Digital Communications Via Authentication and Validation for Wireless User and Access Devices" with Ser. No. 62/652,709, filed Apr. 4, 2018.

FIELD

The present disclosure relates to functional, user-wearable devices that transmit, receive, store, and may temporarily contain data using encryption techniques to protect as well as detect and allow only the proper user(s) of the data. Users of these devices are provided with authentication and validation security, even when the devices are not in use. Specifically, the present disclosure describes devices, methods, and systems for authenticating not only the identity of one or more users, but the ability to encrypt and decrypt data that is sent to, from, and held within these user-wearable devices and utilizing securitized containers as needed. The securitized containers can be software containers and either real or virtual devices.

BACKGROUND

The use of "smart" wearable devices has its historic origins in the use of analogue timepieces—including pocket and wrist watches. Most of the five hundred year old history of watches consisted of the development of the mechanical watch. Watches evolved from portable spring driven clocks, which first appeared in 15th-century Europe. Portable timepieces were made possible by the invention of the mainspring in the early 15th century and most likely were developed by German clockmaker Peter Henlein. The invention of the quartz watch in the 1960s, which ran on electricity and kept time with a vibrating quartz crystal, proved a radical departure for the industry. During the 1980s quartz watches took over the market from mechanical watches, an event referred to as the "quartz crisis". The first digital electronic watch, a Pulsar LED prototype in 1970, was developed jointly by Hamilton Watch Company and Electro-Data, founded by George H. Thiess and started a new revolution wearable devices.

Developments in the 2010s have included smartwatches, which are elaborate computer enabled electronic devices designed to be worn on a wrist. Their ubiquitous use today most likely has its initial roots in military and espionage needs. Although they generally incorporate timekeeping functions, this has become only a small fraction of current smartwatch capabilities. In addition to timekeeping, the user now has the ability to perform consumer purchases and with the invention of credit and debit cards, is able to transact business on an electronic basis as never before. Debit cards draw from a positive account balance maintained by the user and require verification of identification, usually a personal identification number (PIN) to complete a purchase.

"Smart Cards" are another recent transaction device that also requires a personal identification number to complete a transaction. Smart Cards, like debit cards, execute purchases from a positive account balance but the balance is maintained in the card itself. Additions to the card balance must be properly purchased and, typically, Smart Cards have safeguards against an illicit account increase.

Credit and debit-card purchases require the use of a physical card or at least its entry into a purchasing system by number. Users of Smart Cards are not immune to the disadvantages above. A buyer of goods from an automatic Smart Card-reading vending machine is required to swipe the card through a slot. The buyer is then required to enter a PIN to verify his or her identity and authorization for a purchase. Systems have begun to emerge that allow the non-contact use of Smart Cards through RF or infrared technology. However, a PIN must still be entered at some point in the transaction. If a Smart Card is stolen and the thief is able to acquire the rightful user's PIN, then there is no safeguard remaining to prevent the thief s access to the Smart Card's entire balance.

A reliable means of determining the identity of a potential user of a Smart Card, and thus whether that person is an authorized user, is by the use of biometric data identification. Biometric data is data taken from the measurement of some characteristic peculiar to an individual. A digitized thumbprint is an example of biometric data. Iris scans, speech pattern scans or various body temperatures, pH or even electrical characteristics are biometric data that can be used for validating the authenticity of an individual or groups of individuals.

In a system that uses biometric data for identification, a device that reads biometric data scans the relevant measurement of the candidate for identification. The attached system then compares the scanned data with data stored in the Smart Card. A match of data sets is then sufficient for identification.

A more recent implementation of such a scheme is the use of a thumbprint scanner which can read the user's thumbprint and determine whether it compares favorably with a stored thumbprint. If the user's data does not compare favorably, the system to which the identifying device is connected refuses to allow access to either on-board data or a network or, in some cases, a purchase. An iris scanner or a speech pattern reader functions similarly, though may be somewhat more difficult to implement. Systems using biometrics often still require physical contact between a user and a system and the system can be bulky and expensive. One solution to this issue has been to develop user-wearable electronic devices utilizing wireless transactions. These devices include devices that comprises a housing that houses a wireless communication device, one or more electronic circuits, a power source, a display device and a biometric data reading device. While enabled as a timepiece or performing other functions suitable to a user-wearable device (apparatus), the device can establish wireless communication with a counterpart communication apparatus in order to conduct a transaction. The biometric data reading device can read the user's applicable biometric data and then transmit a user identity validation and the wireless communication device can transmit user authorization for the transaction.

Although these devices enable efficient and user-friendly electronic transactions that do not require physical contact and employ biometric data reading in its operation, the need still exists for a user to be able to authorize a completely secured electronic transaction by having a wearable device that provides encryption for at least three vital aspects;

a) secured and uncompromised bio-identification of the user of the devices
b) secured and uncompromised communications and transaction capabilities when using and/or wearing the devices
c) secured and uncompromised access to the devices and all data contained within the user-wearable devices

SUMMARY

The present disclosure provides one or more devices, methods, and systems for a user to enable and authorize an encrypted transaction by having user-wearable devices provide enhanced security for at least four vital functional needs;
a) secured and uncompromised bio-identification of the user of the devices
b) secured and uncompromised communications and transaction capabilities when using and/or wearing the devices
c) secured and uncompromised access to the devices and all data contained within the user-wearable devices
d) providing inoperability to the devices once removed from the designated, authorized, and validated users.

More specifically, the user-wearable devices must be capable of receiving and sending both encryption and decryption of each and every transaction associated with (in some cases continuous) bio-identification of the user as well as any transaction that the user determines should be carried out with the user-wearable devices. These transactions can include but are not limited to electronic, optical, radiative and other forms of signal generating energies and utilize one or more securitized containers. These securitized containers can be software containers and either real or virtual devices. Most often these signals will be transmitted in a wireless fashion.

More specifically, the present disclosure describes;

One or more user-wearable transaction secured devices, comprising: a housing; a computer driven communication module containing a microprocessor and data storage encryption capacity fixedly mounted in the housing; one or more circuits fixedly mounted in the housing and communicatively coupled with the computer driven communication module; a power source coupled with the circuits; at least one transceiver and a biometric data transceiver portion coupled with the housing and coupled with the circuits and with the communication module such that one or more sensors are held within or on one or more surfaces of the devices; wherein the devices transmit and receive encrypted signals that form specific transmissions determined by one or more users, that can utilize one or more securitized containers for the transmissions, to the transceiver; wherein the transceiver determines, via authentication and validation, identification of the users and confirms if the users are wearing the devices via utilization of the computer driven communication module that can utilize one or more securitized containers;
wherein the communication module provides, processes, and analyzes bio-identification, continuous bio-confirmation, and authentication of said users and utilizes the securitized containers as needed and wherein the authentication includes either high security or low security authentication requests and wherein the containers can be software containers and either real or virtual devices.

The circuits can be connected to sensors or themselves function as sensors. In addition, the circuits can be selected from the group consisting of; electronic, optical, and radiation emitting/receiving energized circuits that transmit and receive signals.

One or more display portions can be communicatively coupled with the circuits.

The housing maybe in the shape of a wristwatch, wherein the wristwatch incorporates features that provide functions for one or more devices selected from the group consisting of; a camera, a smartphone, a calculator, a global positioning system (GPS), a radio, a television, a door opener, or other remote energy switching device, and a transceiver, wherein the transceiver is capable of acting as an IP protocol data unit.

The housing can also be in a shape selected from the group consisting of; necklaces, broaches, rings, earrings, badges, belt buckles, assorted jewelry, and articles of clothing.

The signals carry data that is transmitted and received by the transceiver(s) and wherein the transceiver has an ability to analyze and act upon instructions contained within the data and can utilize one or more securitized containers.

The sensors are often biometric sensors that provide biometric data that contains information provided by one or more securitized containers and are used to confirm or deny access to user-wearable devices. The bio-identification initiates a process that requires user action to bio-identify user-wearers followed by initial bio-confirmation and then authentication of user-wearers to enable one or more transactions wherein the transactions are provided by one or more securitized containers.

The bio-identification is continuously confirmed by authentication requests such that if bio-confirmation is not confirmed, a de-authenticate procedure is initiated that utilizes one or more securitized containers and that requires bio-identification confirmation must be re-initiated. The authentication requests can be high security requests that require users actively re-bio-identify themselves in order for authentication requests to proceed and such that a test for bio-confirmation is maintained that results in a confirmation that allows for completion of authentication. Alternatively, authentication requests are low security requests that do not require re-bio-identification, and such that a test for bio-confirmation is maintained that results in a confirmation that allows for completion of authentication and wherein this authentication process utilizes one or more securitized containers. Authentication requests can be communicated to user-wearable devices from external sources or authentication requests can be user initiated originating from user-wearable devices.

Users according to another aspect of this disclosure, are notified when encryption is initiated, in process, or completed and wherein the notification utilizes one or more securitized containers.

The encryption is provided for transmissions during transmission of a credential identifier to control a server and utilizes one or more securitized containers.

The display portions can display timepiece data and/or transaction data.

Further, the biometric transceiver is adapted to read information from one or more of a group consisting of: a user's fingerprints, voice patterns, a body's electrical, chemical, physical, and biological characteristics, biotags, facial characteristics, skin pH, thermal characteristics, ocular characteristics, kinesthetics, and genetic make-up and wherein users are defined as being any member of a genus of an animal or plant kingdom.

Power for the user-wearable devices may be obtained from a variety of sources including via a one or more of a group including a battery, a solar cell, and/or electromagnetic and/or radiative coupling from an external source.

Transmissions sent or received by the transceiver optionally with a biometric data transceiver portion of the transceiver provide internal and external user identity validation for the devices that validate authentication via utilization of at least one distributed auto-synchronous array (DASA) database, wherein the DASA database contains and provides at least one authentication and encryption application and wherein the transmissions utilize one or more securitized containers.

The transmissions access and transmit a portion of data contained within the DASA database to said user-wearable devices, validates data transmitted from the user-wearable devices with a portion of data within the DASA database, and further establishes validity of data according to a set of rules for data residing in the DASA database such that all transmissions incoming to, held within, and outgoing from the sensors or any transceivers of the devices, function securely and singularly for a specific, designated set of users and wherein the transmissions utilize one or more securitized containers.

The DASA database also provides one or more transmittable codes, wherein the codes originate within the authentication and validation applications and wherein the user-wearable devices communicate internally and externally by transmission and reception of data signals.

Codes are securitized in that the codes are not readily accessible from an external source or within the user-wearable devices without passing through a security check to ensure that proper access occurs. The codes should be encrypted.

More specifically, the codes utilize authentication, validation, and encryption applications that authenticate, validate, and encrypt signals between detecting devices capable of searching, retrieving, analyzing, and validating the codes. Further, the codes are generated after installation of the authentication, validation, and encryption applications is complete.

The codes can be either recognizable or not recognizable by the user-wearable devices during attempted authentication and validation. In addition, the codes can be selected from one or more of a group consisting of; a QR code, a bar code, a digital code, a temporal code, a binary code, an analogue code, and a 7-bit binary code.

The data within the DASA database can be and in at least one embodiment, accessed, manipulated, and arranged by a computer driven communication module residing within said devices.

In most embodiments, the transmissions are wireless and the transmissions provide communications that are transmitted and received via oral, verbal, text, video, and data messaging and wherein the communications can be displayed.

In at least one instance, authentication is a challenge response system utilizing transmissions and one or more securitized containers wherein transmissions lead to one or more transactions. The challenge response system utilizes communications that contain implicit or explicit logic and one or more securitized containers. Implicit logic requires a pre-arranged sets of data variables in a form of communications with one or more transceivers and one or more securitized containers, so that authentication can proceed. Alternatively, explicit logic requires creation and analysis of different sets of data variables in a form of communications with one or more transceivers, so that authentication can proceed.

In at least another instance, the form of communications can define a credential identifier. The credential identifier comprises at least some form of data such as meta data combined with at least one authentication. Further the credential identifier comprises at least some form of data such as meta data combined with authentication requests. The credential identifier includes at least one of the group consisting of meta data, authentication, and authentication requests are encrypted and utilize one or more securitized software containers. The meta data includes an acknowledgement/non-acknowledgement portion that provides a path to determine access controlled by the server and/or the user-wearable devices that becomes one or more transactions and utilizes one or more securitized containers.

In a further embodiment, the communication module also includes an authentication module that performs a challenge response for the credential identifier by initially sending meta data to a server and utilizes one or more securitized containers. The authentication module is an input/output module that sends and receives transmission signals to and from the server in response to reception of the credential identifier and utilizes one or more securitized containers. The communication module is configured to transmit the credential identifier to access control of a server and utilizes one or more securitized containers via a wireless communication link. The communication module includes an interface to data residing on a server and wherein a form of the data can be displayed on the user-wearable devices. The server can be configured to authenticate said credential identifier during comparison against entries of one or more keys within a set of data configuration tables residing in the DASA database and utilizes one or more securitized containers. The application is secured in a secured DASA database within a secured cloud or other secured storage device utilizing the encryption application.

In an additional embodiment the encryption application employs a step-wise process as follows; a user of one or more user-wearable devices invokes secured transmission as attempts to acquire a key using tolerance techniques that provide for a number of attempts (n) to retrieve keys from a configuration table, wherein said encryption application possesses a get next key algorithm that is invoked locally on or in proximity to said user-wearable devices. The encryption application also provides for generation of encryption keys as well as a new master key, and simultaneous attempts are made to match one or more user identification (ID) encryption keys within a user ID encryption key database and wherein the encryption application utilizes one or more securitized containers. A tolerance range allows for a search of matching encryption keys that synchronizes with the user ID encryption key database.

In at least one instance, the encryption application is added to provide additional security layers required for the user-wearable devices so that a proper match is determined and establishes whether a user of the user-wearable devices is allowed access privileges. If access is allowed, a user's user-wearable device provides via oral, visual, text, or data signal transmission that utilizes one or more securitized containers, a display that provides at least a derivation of said match so that said user is notified and allowed access. All encryption keys can be removed from the data configuration table either before, during, or after the match, such that a key management system exists and utilizes one or more securitized containers to ensure that the keys themselves are neither discoverable nor compromised. If access is denied, said user's user-wearable device provides via oral, visual, text, or data signal transmission that utilizes one or more securitized containers. displayed as a denial of a match.

Lack of matching causes an encryption application that resides with the user's user-wearable device is removed and wherein to further ensure that master keys in the data configuration table are protected and secured, a new master table key is generated either via a signal from the user devices to one or more secured DASA database or via a signal from the key management system that utilizes one or more securitized containers.

The communication module invokes use of at least one of the group of interfaces comprising a serial interface, a TCP/IP interface, an IEEE 802.11 interface, an IEEE 802.15.4 interface, and a secure HTTP interface.

A method for transmitting and receiving data signals from one or more user-wearable secured transaction devices that utilize one or more securitized containers comprising: establishing communications with a transaction counterpart; selecting a transaction; reading and authenticating encrypted biometric data of the user of the devices; validating said user's biometric data; and transmitting an encrypted user identity validation upon successful validating of the user's biometric data, wherein transmissions sent or received by a transmissions transceiver portion of the devices is providing user identity validation for said devices via utilization of at least one DASA database that possesses an authentication and encryption application.

One method that involves several aspects of this disclosure includes transmissions that are accessing and transmitting a portion of data contained within the distributed auto-synchronized database (DASA) to the user-wearable devices, validating data transmitted from the user-wearable devices with a portion of data held within the DASA database, and further establishing validity of data according to a set of rules for data residing in the DASA database such that all transmissions incoming to, being held within, and outgoing from the circuits or any transceivers of the devices, are functioning in a secure manner for a specific, designated set of users.

Further, the DASA database provides one or more transmissible, securitized, and encrypted codes, wherein the codes originate within the authentication and encryption application, and wherein the user-wearable devices communicate internally and externally by transmission and reception of data signals that utilize authentication and encryption application(s). The transceivers function as detecting devices that search, retrieve, and analyze a code generated after installation of the authentication and encryption application is complete. The method includes the use of codes that are either recognizable or not recognizable by the user-wearable devices during attempted authentication and validation.

In at least one embodiment communications and are enabled with Bluetooth technology. The communications are enabled with infrared technology. The transaction could be a purchase, a command, and/or control of a switch, and wherein transaction is selected from one or more of a group consisting of data, voice, and video transmissions that control hardware.

One of the methods includes providing a user's biometric data that is electronically stored within one or more memory storage systems selected from any one or more of a group consisting of; memory chips, internal or external servers, and a cloud data storage medium, that exist internally to or externally from the user devices. The communications may be disabled until the user's data is authenticated and validated and/or re-authenticated and revalidated.

In at least one other embodiment, a system is employed for one or more user-wearable transaction secured devices for transmitting to and receiving data from one or more user-wearable secured transaction devices to another that utilizes one or more securitized containers, comprising: establishing communications with a transaction counterpart; selecting a transaction; reading and authenticating encrypted biometric data of one or more users of said devices; validating said users' biometric data; and transmitting encrypted users identity validation upon successfully validating said users' biometric data, wherein transmissions sent or received by a transmissions transceiver portion of the devices is providing users identity validation for the devices via utilization of at least one DASA database that possesses an authentication and encryption application.

The transmissions are accessing and transmitting a portion of data contained within the auto-synchronized database to said user-wearable devices, validating data transmitted from the user-wearable devices with a portion of data held within the auto-synchronous database, and further establishing validity of data according to a set of rules for data residing in the auto-synchronized database such that all transmissions incoming to, being held within, and outgoing from the circuits or any transceivers of the devices, are functioning in a secure manner for a specific designated set of users.

For the system, the DASA database provides one or more transmissible, securitized, and encrypted codes, wherein the codes originate within the authentication and encryption application, and wherein the user-wearable devices communicate internally and externally by transmission and reception of data signals that utilize the authentication and encryption application and wherein transceivers function as detecting devices that search, retrieve, and analyze a code generated after installation of the authentication and encryption application is complete. The system includes codes that are either recognizable or not recognizable by the user-wearable devices during attempted authentication and validation.

It is necessary to protect the content, quality and integrity of the authentication and associated authentication requests. In the present disclosure, this is accomplished, in part, by using a credential identifier that is sent or received during the authentication process. More specifically, utilization of meta data is combined with authentication so that an acknowledgement/non-acknowledgement status can be achieved. This combination of meta data and authentication are the elements needed to create a credential identifier which can be encrypted. The meta data is describing what is being acknowledged or not acknowledged. Non-acknowledgement is not a requirement of the authentication methodology. The encryption may be either static or dynamic. Dynamic encryption can utilize the DASA database in order to encrypt the meta data, the authentication, and/or the credential identifier. For the purposes of the present disclosure, encryption of the credential identifier or its associated elements (meta data and authentication) is not an absolute requirement.

In one instance of authentication, an encrypted credential identifier is provided to a control server. The authentication module communicating with the server is configured to authenticate the credential identifier against entries of one or more keys within a set of tables and an input/output module is configured to send and receive transmission signals to and from the credential identifier once the credential identifier has been successfully authenticated and/or validated.

In at least one embodiment, the encryption application employs a step-wise process as follows; a user of one or more user-wearable devices invokes secured transmission as attempts to acquire a key using a tolerance method are made. The tolerance method provides for a number of attempts (n) to retrieve keys from a configuration table. The encryption application possesses a get next key algorithm that is invoked locally on or in proximity to the user-wearable device. This encryption application allows for generation of encryption keys as well as generation of a new master key. Simultaneously, attempts are made to match one or more user identification (ID) encryption keys within a user ID encryption key database. A tolerance range is allowed to search for matching encryption keys which synchronizes with the user ID encryption key database.

A system that employs secured user-wearable devices for transmitting to and receiving data from one or more user-wearable secured transaction device to another is also considered. The system utilizes the establishment of communications with a transaction counterpart; selecting a transaction; reading and authenticating encrypted biometric data of the user of the devices; validating the user's biometric data; and transmitting an encrypted user identity validation upon successfully validating the user's biometric data. The transmissions sent or received by a transmissions transceiver portion of the devices provides user identity validation for the devices via utilization of at least one DASA database that possesses an authentication and encryption application.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

Embodiments of the present invention are presented in the following drawings.

DETAILED DESCRIPTION

Figure 1A:
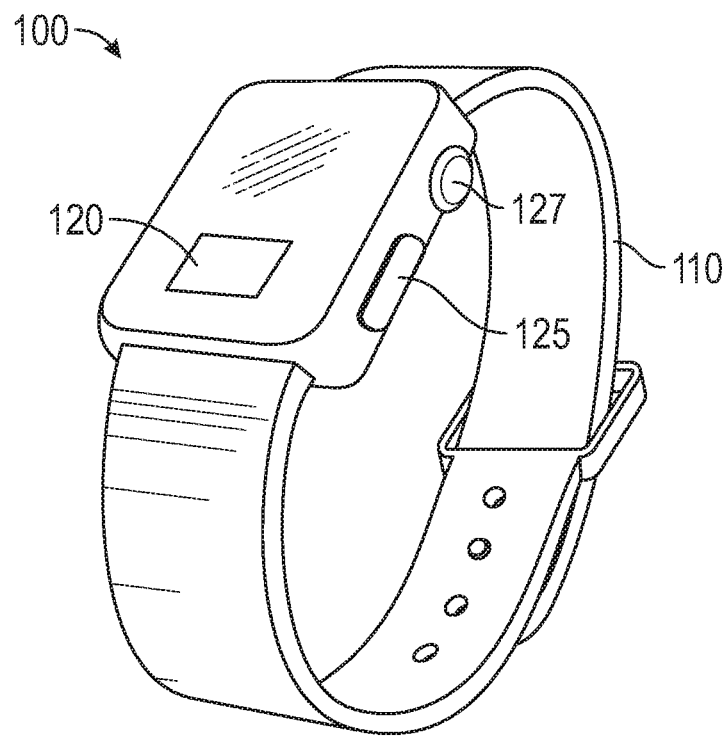
FIG. 1A illustrates one embodiment of a user-wearable device in the form of a wristwatch with a display for displaying data including time, date, and year.

Reference will now be made in detail to the one or more embodiments of the invention, examples of which are illustrated in the accompanying drawings.

These descriptions and representations provided so as to be understood by those skilled in the data processing arts to most effectively convey the substance of their work to others skilled in the art. A procedure, flow chart, logic block, process, etc., is here, and generally understood to be a self-consistent sequence of steps or instructions leading to a desired result. The steps are those requiring manipulations of physical quantities. Usually, though not necessarily, these quantities take the form of electrical, magnetic, and/or optical signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

For the purposes of this disclosure, the hierarchy associated with the user-wearable devices is a bottom up list as follows (meaning the hierarchy is a pyramid that begins at its pinnacle with circuits and ends at its base with transactions);

Circuits that connect to devices and carry signals. The circuits can carry signals in one or more directions and the circuits may also be connected to sensors.

(a) Signals. that travel via one or more circuits
(b) Transmissions, that travel via signals
(c) Communications, that are transmitted via transmissions carried via signals over or through circuits
(d) Authentication(s) which are achieved and confirmed after communications are sent or received;

and;

Transactions that occur once authentication(s) are properly validated and completed and then are sent and/or received.

It should be borne in mind, however, that all of these and similar terms are to be associated with appropriate physical quantities and are merely convenient labels applied to these quantities. Unless specifically stated otherwise as apparent from the following discussions, it is appreciated that throughout the present disclosure, discussions utilizing terms such as "setting," "storing," "scanning," "receiving," "sending," "disregarding," "entering," "establishing," "selecting," "reading," "validating," "transmitting," or the like, refer to the action and processes of a computer system or similar intelligent electronic computing device, that manipulates and transforms data represented as physical (electronic/magnetic/optical) quantities within the computer system's registers and memories into other data similarly represented as physical quantities that is recognized by the same or other computer system memories or registers or other such information storage, transmission or display devices.

This discussion of this embodiment of the present disclosure that addresses the use of wearable user-devices that provide transmission transactions, involving authentication and validation of a user's identity as an authorized user as well as encryption and decryption of data that is transmitted to, received by or otherwise resides on the devices themselves.

Figure 1B:
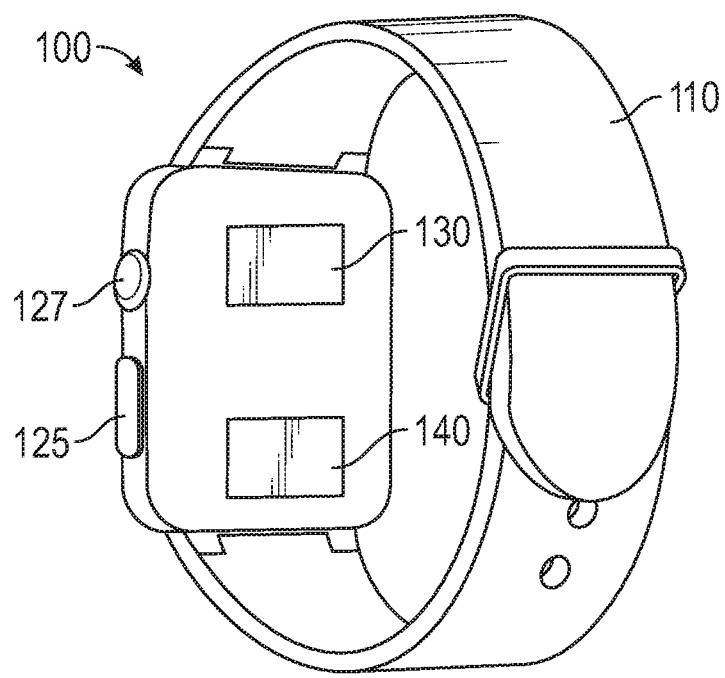
FIG. 1B illustrates a second embodiment of a user-wearable device in the form of a wristwatch indicating two back panels of the same display which contact the user's wrist.

FIG. 1A, illustrates one embodiment of a user-wearable device in the form of a wristwatch with a display for displaying data including time, date, and year. One embodiment of the present disclosure is a device in the form of a wristwatch that benefits from high security of the transmission of data as well as biometric authentication and verification while remaining convenient for detailed transactions. The security aspect is detailed below as it pertains to FIGS. 2A and 2B. For FIG. 1A, a user-wearable device (100) in the form of a wristwatch is shown with a wristband (110) which holds a panel and panel display portion (120). The user-wearable device in the form of a "smart watch" also provides for two additional features on the side of the panel and panel display portion (120) including a mechanism for controlling power (125) to and from the device (100), as well as a scrolling mechanism (127) that allows for viewing information as necessary by the user. In FIG. 1B, the back portion of the device indicates two biometric transceivers shown as sensors (130 and 140) which can also act as sensor-scanners capable of transmitting, receiving, storing, and analyzing biometric data. This data from the user includes, for example a user's one or more fingerprints, voice patterns, body electrical characteristics, skin pH, thermal characteristics as well as all aspects of ocular characteristics. This data is used to authenticate and validate the user as earlier described in the summary of the invention, but is more specifically detailed according to the flow chart provided in FIGS. 2 and 3. The data is transmitted via transmission that is encrypted and decrypted as required to ensure proper security. As stated above, the devices (100), have a housing with a computer driven communication module fixedly mounted in the housing; one or more circuits fixedly mounted in the housing and communicatively coupled with the computer driven communication module; a power source electronically coupled with circuits; a display portion communicatively coupled with the circuits; at least one transmissions transceiver, and one or more biometric data transceivers (130 and 140) in this case coupled with the back side of the display and electronically coupled with the circuits, transmissions transceiver, and with the communication module, wherein transmissions sent or received by the transmissions transceiver and the biometric data transceivers provide internal and external user identity validation for the devices. Validation is performed via utilization of at least one auto-synchronous database that possesses an authentication and encryption application. The transmissions access and transmit a portion of data contained within the auto-synchronized database to the user-wearable devices, validates data transmitted from the user-wearable devices with a portion of data within an auto-synchronous database, and further establishes validity of data according to a set of rules for data residing in the auto-synchronized database such that all transmissions incoming to, held within, and outgoing from the circuits or any of the transceivers of the devices (including 130 and 140), function securely and singularly for a specific, designated set of users. The DASA database provides one or more transmissible, securitized, and encrypted codes such that the codes originate within the authentication and encryption application. The user-wearable devices communicate internally and externally by transmission and reception of data signals that utilize the authentication and encryption application so that the transceivers can function as detecting devices that search, retrieve, and analyze a code generated after installation of the authentication and encryption application is complete. The code is either recognizable or is not recognizable by the user-wearable devices during attempted authentication and validation. In one set of embodiments, the code is selected from the group consisting of; a QR code, a bar code, a digital code, an analogue code, and a 7-bit binary code. The auto-synchronous database is manipulated by the computer driven communication module residing within the user-wearable devices.

Figure 2:
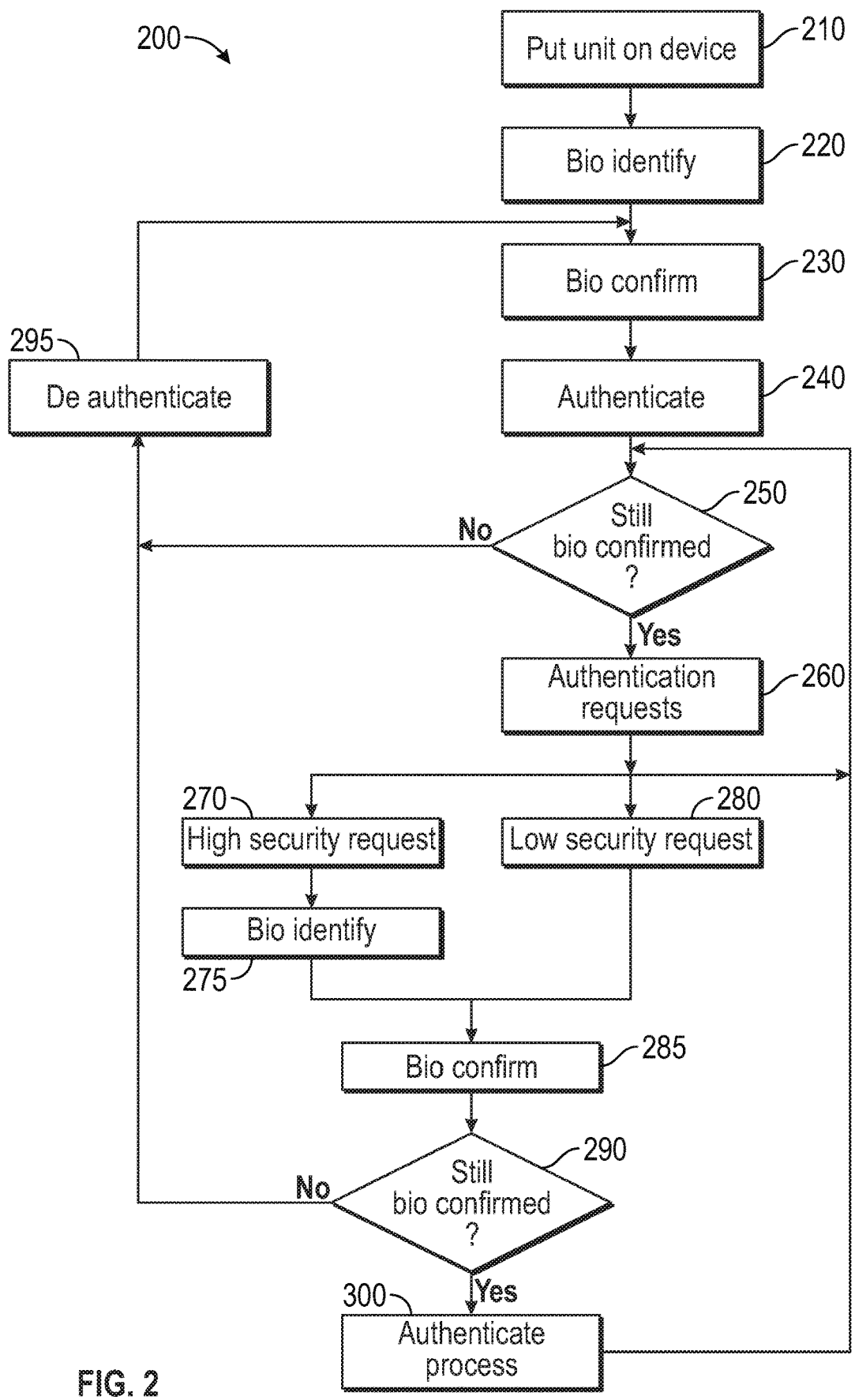
FIG. 2 is a flowchart indicating one technique by which a user is bio-identified and authenticated allowing and enabling the user to access and work with one or user-wearable devices.

In a specific embodiment the process (200) is outlined in the flowchart of FIG. 2, whereby as user puts the device on (210) to make it wearable. This initiates a bio-identification (220) process described above that requires user action to bio-identify themselves, followed by initial bio-confirmation (230), and then authentication of the user-wearer (240). If after this initial process, the bio-identity is continuously confirmed (250) then if there are authentication requests (260), the process for these requests is initiated. It is important to note that authentication requests can be communicated to the user devices from external sources, or that the authentication requests can be user initiated from the user devices. If the bio-confirmation is not still confirmed, a de-authenticate procedure (290) begins which requires that a bio-identification (220) process must be re-initiated.

Referring back to the authentication requests (260), an option exists for either high security requests (270) or low security requests (280). The higher security requests (270) requires that the users actively re-bio-identify themselves (275) to continue the authentication process. A test for bio-confirmation (285) is maintained (290) resulting in transmission confirmation (300).

For lower security requests (280) the re-bio-identification step (275) is not required. It is possible, based on the present embodiment to keep the ease of simple transactions unencumbered so that after the authentication request allowance (260) is performed, transmission to a lower security request occurs (280) and the transmission is allowed assuming that bio-confirmation (285) is maintained (290) resulting in transmission confirmation (300). Other security levels allowing for other authentication methods could also be invoked.

The choice here, regarding the encryption via the encryption application previously described will be according to the designer(s) of the user-wearable devices. Most likely encryption will be kept to a minimum for these lower security requests.

There are two feedback loops in continuous operation. The first loop continuously bio-confirms the user has not removed the device or that another user has taken the device. This loop returns to (250) which is the continuously confirmed bio-identity from either (260) ready to process authentication requests or (300) when an authentication request has been completed. The second loop de-authenticates the user (295) whenever the user has removed the device or another user has taken the device. These continuous feedback loops reassures the ability to ensure authentication.

Figure 3:
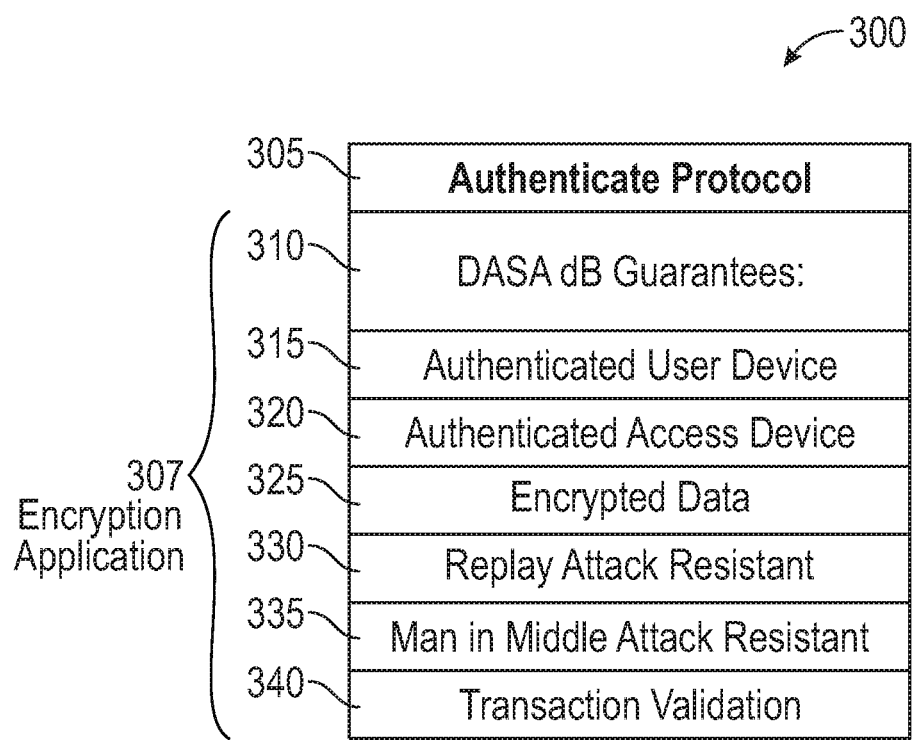
FIG. 3 is a flowchart and subsection the flowchart of FIG. 2, indicating one technique by which transmissions to and from one or more user-wearable devices are provided with encryption technology.

Once transmission confirmation is reached (300) according to FIG. 3, the authenticate protocol (305) which triggers the use of the encryption application (307). This encryption application (307) utilizes the DASA database (310) and includes features (315, 320,325,330, 335, and 340) and guarantees a secure and specific connection with an authentic user is perfected (310). The authenticated user device (315) and the authenticated access device (320) are guaranteed by the synchronicity of keys within the DASA database. The DASA database encryption also guarantees fully encrypted data and transmission (325) of the data. The synchronicity of the keys within the DASA database is what blocks the ability to replay any transaction (330). This blocking also prevents any third party "man-in-the-middle"

piracy (335) from occurring, as the third party "hacker" would have to be able to establish the use of the continuously changing new codes to be able to confirm either bio-identity or to access the transmissions. Finally, the system ensures that the user of the wearable-user device is actually the user and not a third party requestor (340) by continuously checking biomarkers associated with the bio-identity of the user vs that of a "posing" requestor.

In the implementation of the embodiment envisioned, wearable-user devices can include a wearable piece of functional jewelry or other wearable accessories in addition to that of a smart watch. This implementation, not only houses the electronics and transceiver devices, it also provides both biometric and transmissions encryption applications to remove any security threat known. Note that, while this discussion focuses on the implementation of this embodiment as a smart watch which can function as a timepiece, many other implementations are envisioned, including wearable broaches, tie pins, cufflinks, belt buckles or even writing pens or PDA styli.

Both the aforementioned implementations of this embodiment of the present invention provide opportunity for multiple levels of security. By requiring multiple levels, the secure limitation of the operation of the transactional capabilities regarding these embodiments to a single, specific user is virtually impenetrable.

The range of applications regarding transmissions and associated transactions has no discernible limit. A few exemplary applications are outlined here in order to fully understand the need for securitizing such items as e-cash devices where the counterpart maybe an electronic wireless vending device. Another example could be the use of cars parking at a public parking meters or purchasing gasoline/diesel for automobiles, boats, or other modes of transportation. In fact the use of the user-wearable devices allows for the possible implementation of a proximity check that could be enabled by RF communications such as Bluetooth or use with GPS coordinates where it might be necessary to allow only very specific groups of users to access these transmissions and/or forms of communications. Military applications are also envisioned for essentially any war or peacetime activity where only certain individuals will be allowed access to the transmissions. Use of biometrics for each of these individuals could be based on various implantable wearable devices that emit signals specific only to that group.

The essence of these embodiments remains that of providing biometric data to validate a user's identity in order to authorize different transactions. Though the embodiments presented herein have focused on implementation of the present invention as a smart watch, other devices could be implemented including writing instruments, key chains or other items easily and normally worn by users.

Figure 4:
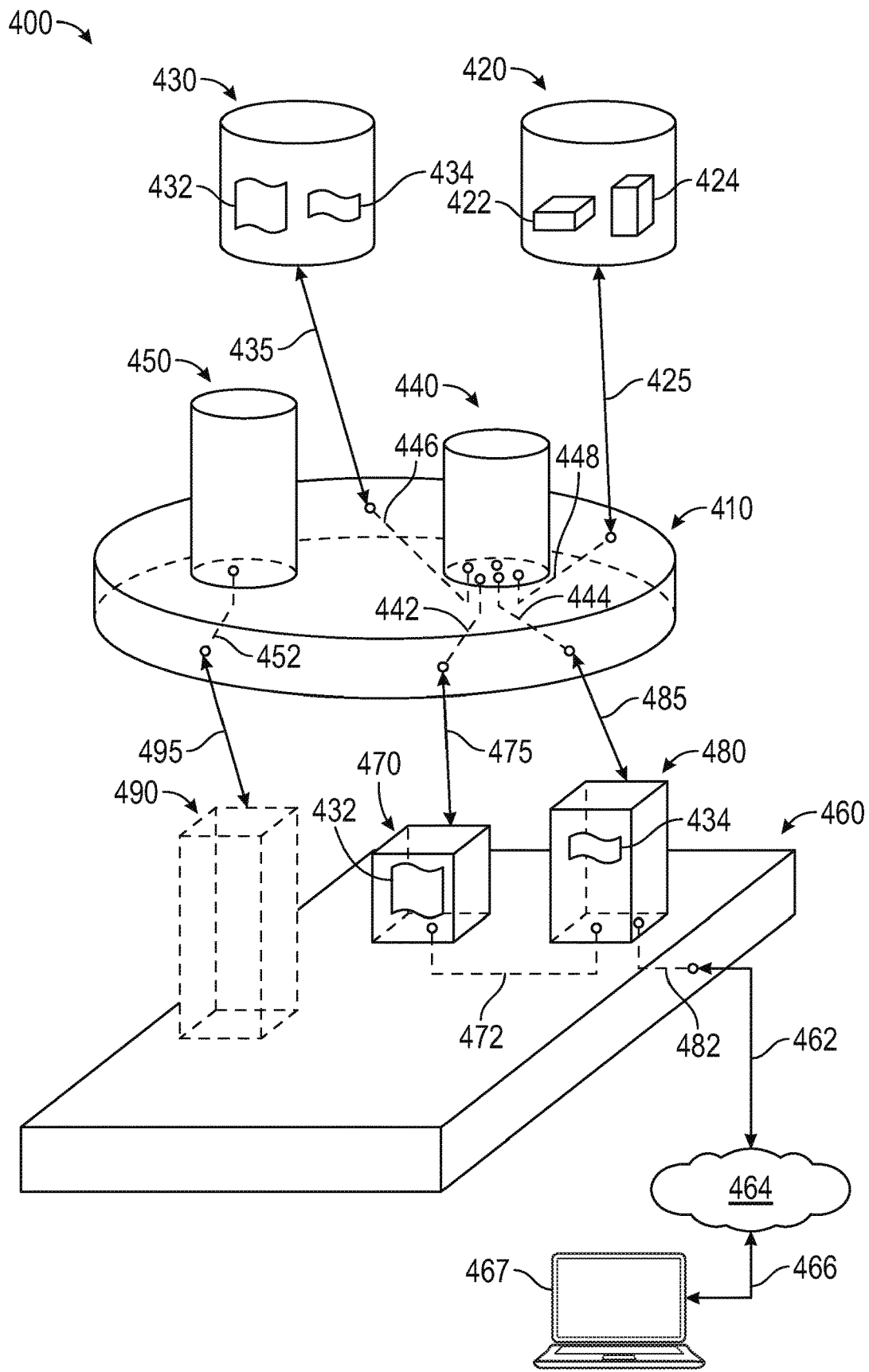
FIG. 4 is a three-dimensional schematic diagram illustrating and representing an exemplary device and associated system that provides the "ICEMicro" securitization and encryption device and associated system for securitized containers.

For FIG. 4, the managed securitized container device and system (400) is shown as a three-dimensional schematic which initially includes a control plane (410), a container repository (420) and an application repository (430) with two (normally software) container prototypes (422,424) within the repository (420), and with two different types of applications logic (432,434), and a connector (425) which connects the containers (422, 424) to the control plane (410) as well as a connector which connects the application repository (430) to the control plane (410). Heading down the schematic from the top toward the bottom portions, there exists a control plane logic canister initiator and monitor (440), which is similar to but not necessarily identical to the control plane logic remover and destroyer canister (450).

Here it is important to note that once these canisters and eventually the containers, that may be created within or by the canisters, once used, will be discarded or destroyed. In other words, the usefulness of the containers, (440, 450) once they have delivered (as initiators followed by destructors) their content, diminishes and often has no further use. To alleviate or eliminate potential data memory and processing issues that occur for the overall system, discarding the containers is a normal course of activity for software developers. The containers may have had their contents emptied or they may be reused if not emptied. Moving further toward the bottom of the system (400), signals (normally communications signals) travel (442) from the control plane logic canister initiator and monitor toward the trust plane (460) via a connector path (475) from the control plane (410) to a shorter container (470) with application logic (432) which is either embedded in or sits atop the trust plane (460). The trust plane (460) provides both securitization and encryption as required by the system (400).

Likewise, signals travel (444) from the control plane logic canister initiator and monitor (440) via a connector (485) which also provides a signal path (or tunnel) toward the trust plane (460) via a connector (485) from the control plane (410) to a longer (higher) container with application logic (480) which is either embedded in or sits atop the trust plane (460). In some cases, the signals may travel from connector (446) connecting the application repository (430) directly to the control plane (410) bypassing the canisters (440,450) and eventually via a pathway (442) toward the connector path (475) which enters either the container (470) or a portion of the trust plane (460). As before, the trust plane (460) provides both securitization and encryption as required by the system (400).

In addition, there is a signal path (446) that connects the control plane logic canister initiator and monitor (440) via pathway (435) and an application repository (430) with two (normally software) application logic prototypes (432,434) to ensure securitized communication(s) along this and all signal paths. Likewise, a signal path (448) connects control plane logic canister initiator and monitor (440) to a connector (425) which connects the containers (422, 424) to the control plane (410) as well as a connector which connects the container repository (420) to the control plane (410) for complete logic control that includes creating canisters and containers or bypassing canisters and directly creating containers.

To complete the signal path from the control plane (410) toward the trust plane (460), a shorter container (470) with application logic (432) is created and exists on or is embedded in the trust plane (460). The signal path (472) provides for flow and connection between the shorter container (470) and the longer (higher) container (480) which contains application logic (434). A connector path (485) also exists and allows for signals to pass from the control plane (410) and plane logic initiator and monitor (440) via an initial signal pathway (444).

There is also a connector path (475) from the control plane to the shorter container (470) and essentially identical signal paths (485, 495) which connect with both the longer (larger, higher) container (480) and the virtual container (490). The signal path (482) either leads signals toward or receives signals from an unsecured environment via a connection (462) and/or connection path that connects the trust plane (460) and/or containers (470,480,490) with either a cloud environment (464), where unsecured data may reside and eventually via a connector path (466) to a computer (467).

Also existing on or in the control plane (410) is a control plane logic canister remover and destroyer (450). Here a signal path (452) is used to connect the canister remover and destroyer (450) to a virtual container (490) via a signal path (495) that is also located at (in or on) the trust plane (460). This represents a communication path for the "end of life" for the virtual container (490) which initially existed as a real container. This entire portion of the schematic representation (450,452, 490, and 495) will disappear at the end of life once the container has been utilized. This also is provided to represent the ephemeral nature and connections associated with software containers as used by software developers today.

Figure 5:
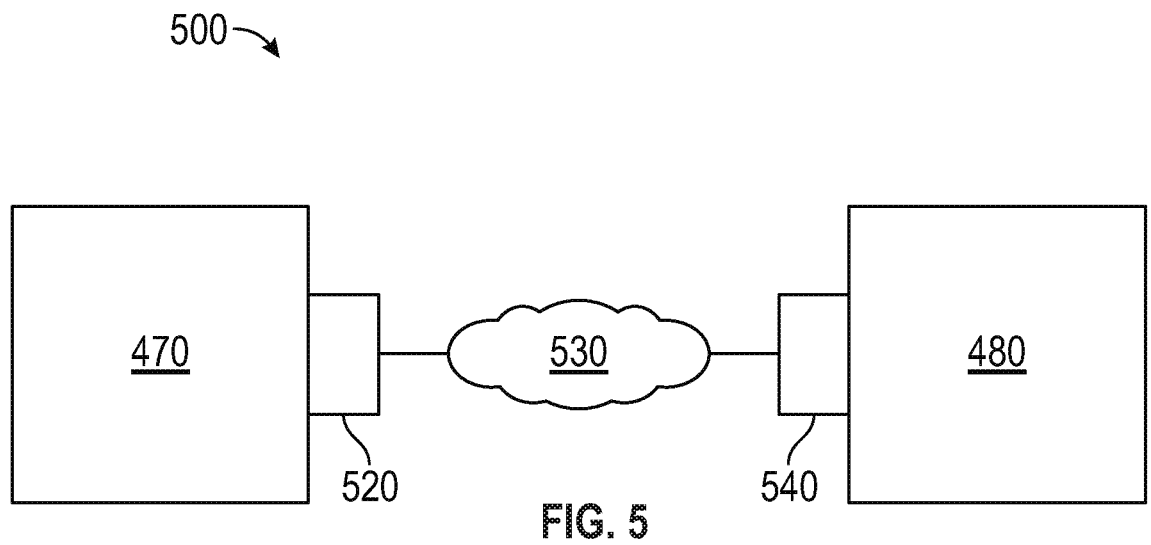
FIG. 5 is a schematic diagram illustrating and representing securitization and encryption of communications using "ICEMicro" between two securitized containers.

FIG. 5 is a schematic representation of the physical implementation regarding how two (or more) containers can communicate in a secure and optionally encrypted manner (500) residing on a trust plane (460). The first container which was represented as the shorter of the two containers (470) in FIG. 4, resides on a trust plane (460—shown in FIG. 4 only) as also shown in FIG. 4 that both sends and receives signals through a transceiver (520). Likewise, the second container, represented as the taller of the two containers (480) both sends and receives signals through another transceiver (540). Both transceivers are either actually or virtually connected to each of the containers. A cloud computing environment (530) may exist between the two containers (470,480) which will be able to access the cloud (530) as needed via signal transmission (data transmission) via the two transceivers (520,540).

Figure 6:
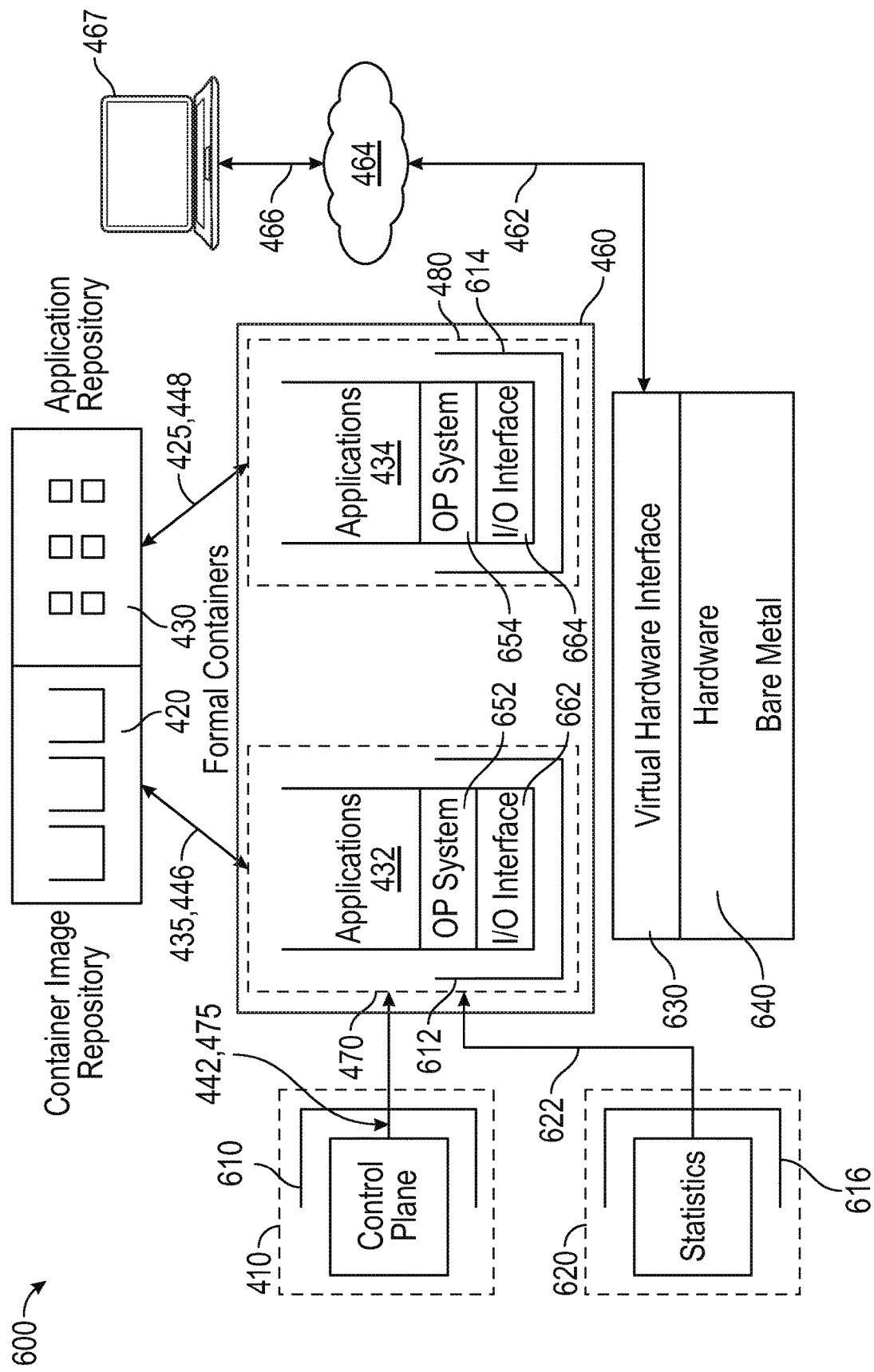
FIG. 6 is a two dimensional detailed schematic overview and flow path associated with the exemplary device and associated "ICEMicro" system shown in FIG. 1.

FIG. 6 is a more detailed two-dimensional version (600) of the managed securitized container device and system (400) schematic shown in FIG. 4 representing most possible signal flow paths for the system. As for FIG. 4, there exists an applications repository (430) and a container repository (420). As in FIG. 4, the full container (470) is shown with a dashed line representing the fabric that comprises the container with the application logic (432) as described above. In addition, dashed and solid lines exist to represent the entire "fabric" of the ICEMicro securitization employment as shown with (610,612,614) for the control plane (410) and the two containers (470, 480).

Together with the application logic (432) there is also shown and deployed an operating system (652) and an I/O interface (662) to ensure communications with a second container (480) having its own application logic (434), operating system (654), I/O interface (664) so that they can communicate with each other and the cloud (464) and computer (467). There is also included a virtual hardware interface (630) sitting on the actual hardware (bare metal), (640). The system is controlled by a controller residing in or on the control plane (410). In addition, there is a statistics communication processor that allows a software developer the ability to monitor and analyze the system continuously through both the control plane fabric (610) and the statistics communication processor plane and fabric (620). The statistics communication processor (616) is connected to the statistics plane via (622) which is the connector from (620) to the trust plane (460) as shown in FIG. 4. All connector lines for FIG. 6 are the same as those described in FIG. 4. Here, however, in FIG. 6, it is necessary to employ the virtual hardware interface (630) and accompanying hardware (640) using a virtual hardware interface that is the hardware visor, and could exist as a virtual hypervisor (shown as 420,430 in FIG. 6—which corresponds with but may not be identical to that shown in FIG. 4). In the case of FIG. 6, the operation of the managed securitized container device and system (400) is now enhanced by the utilization of both the statistics communication processor and either a hyper or real visor device that exists between the repositories (420, 430).

Figure 7:
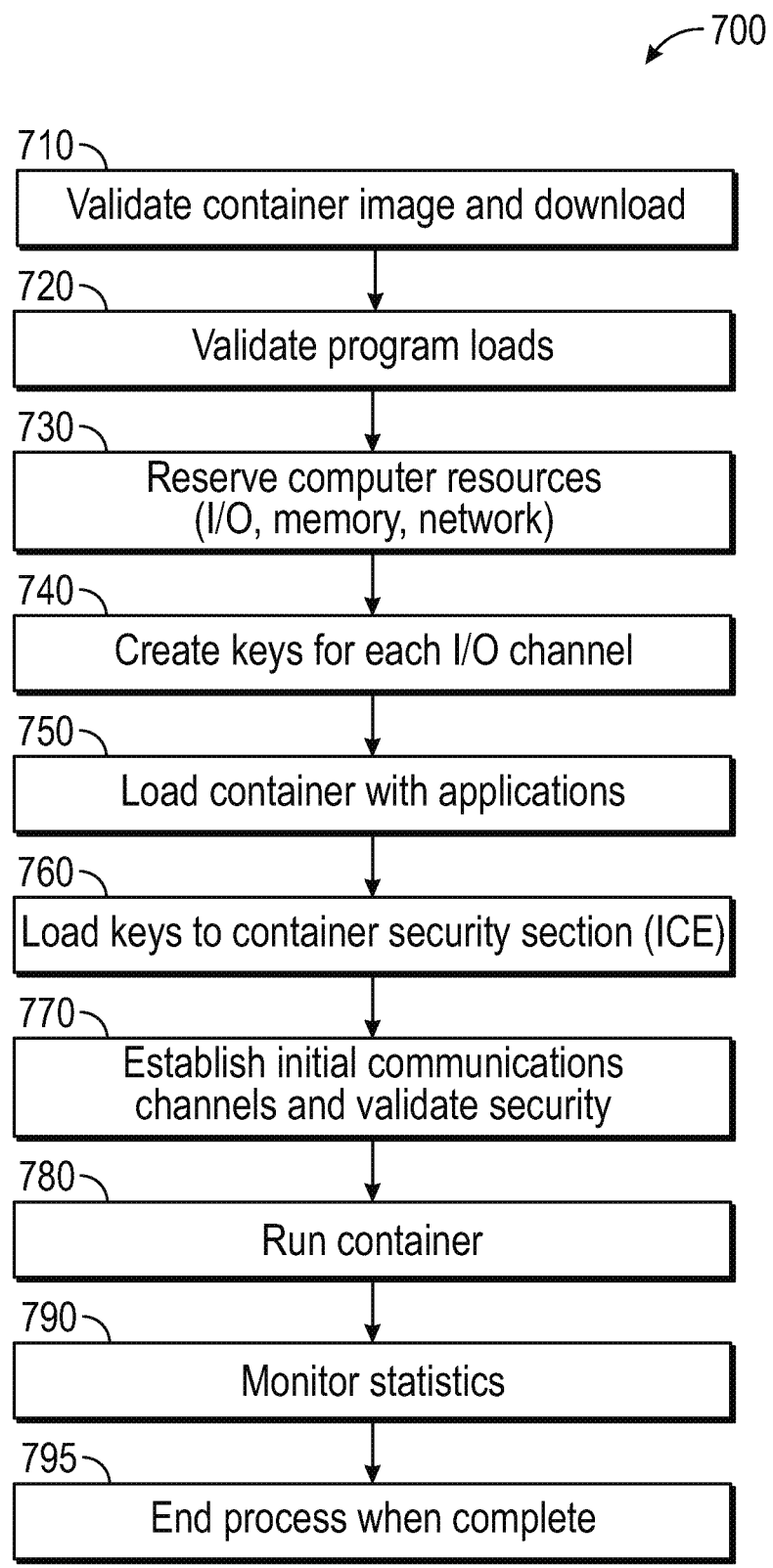
FIG. 7 is a flowchart that indicates the methodology for implementing the "ICEMicro" system for securitizing securitized containers.

FIG. 7, is a flow diagram that provides one actual methodology associated with using the managed securitized container device and system. In this case, initially the container image is validated and downloaded (710). Next a validated program is loaded (720) which often requires reserve computer resources including I/O—input/output—interface(s), a memory, and network capabilities (730). To ensure the encryption is implemented, keys are created for each I/O channel (or tunnel), (740). This provides a transmissions path for loading containers with software applications that are protected by encryption described herewithin (750). Once the keys exist, they can be loaded to the container security portions (known herein as ICEMicro), (760). This leads to establishment of initial communications channels (tunnels) and allows for validation that security has been implemented (770).

Finally, the use of the container is possible and it can be "run" so that its function in developing the software application can be completed (780). As the methodology and system (700) is proceeding, statistics involving all aspects of the system including all securitization and encryption can be monitored (790). This leads to understanding and being notified when using the managed securitized container device and system has been completed (795).

The availability of such a system allows for stronger security regarding the degree of confidentiality with more confidence. Employing this system further establishes the goal to help encryption systems develop a larger acceptance reputation. Such acceptance provides a consequent increase in usage and a worldwide strengthening of data communications, electronic mail, and commercial electronic transactions.

While most of the foregoing discussion about the present encryption technique has focused on the use of databases, lists and tables for storing transaction specific codes, it may be preferred in some applications having limited memory to provide an algorithm for calculating the next transaction specific code. The concept of "tolerance" described earlier may be incorporated either by setting an acceptable range of values for the transaction specific code (output of the algorithm) or the designated portion itself (input to the algorithm), the later being the equivalent of back calculating the designated portion and verifying that it is within the range of tolerance.

The embodiments of the present invention discussed herein present various implementations of a user-wearable electronic wireless communication transaction device. These embodiments provide different ways to achieve an easy-to-incorporate form factor and convenience of operation in accomplishing transactions wirelessly and without physical contact between the user-wearable device and any applicable counterpart device.

While the invention will be described in conjunction with these embodiments, it will be understood that they are not intended to limit the invention to these embodiments. Contrarily, the specification is intended to cover inventive alternatives, modifications and equivalents, which may be included within the spirit and scope of the invention as defined by the appended claims. Furthermore, in the following detailed description of the present disclosure, numerous specific details are set forth in order to provide a thorough understanding of the present disclosure. However, it will be obvious to one of ordinary skill in the art that the present disclosure may be practiced without these specific details.

In other instances, well-known methods, procedures, components, and circuits have not been described in detail so as not to unnecessarily obscure aspects of the present disclosure. The foregoing descriptions of specific embodiments of the present disclosure have been presented for purposes of illustration and description. They are not intended to be exhaustive or to limit the invention to the precise forms disclosed, and obviously many modifications and variations are possible in light of the above teaching. The embodiments were chosen and described in order to best explain the principles and its practical application, to thereby enable others skilled in the art to best utilize the disclosure and various embodiments with various modifications as are suited to the particular use contemplated.

The computer readable media described within this application is non-transitory. In most if not all cases, the transmission of data is transmitted via signals that are non-transitory signals.

In addition, each and every aspect of all U.S. Provisional Applications and US Non-Provisional applications as well as any of the cited granted patents listed above are hereby fully incorporated by reference.

In compliance with the patent laws, the subject matter disclosed herein has been described in language more or less specific as to structural and methodical features. However, the scope of protection sought is to be limited only by the following claims, given their broadest possible interpretations. The claims are not to be limited by the specific features shown and described, as the description above only discloses example embodiments. While the foregoing is directed to preferred embodiments of the present invention, other and further embodiments of the invention may be devised without departing from the basic scope thereof, and the scope thereof is determined by the claims which follow.

I claim:

1. One or more user-wearable transaction secured devices that transmit to and receive data from one or more user-wearable transaction secured devices to another, comprising: a housing; a computer driven communications processor containing a microprocessor and data storage encryption capacity fixedly mounted in said housing; one or more circuits fixedly mounted in said housing and communicatively coupled with said computer driven communications processor; a power source coupled with said circuits; at least one transceiver including a biometric data transceiver portion coupled with said housing and coupled with said circuits and with said computer driven communications processor where one or more sensors are held within or on one or more surfaces of said user-wearable transaction secured devices;

wherein said user-wearable transaction secured devices transmit and receive encrypted signals from one or more said user-wearable transaction secured devices to another that form specific transmissions determined by one or more users, that utilize one or more securitized containers for said transmissions to said at least one transceiver and said biometric data transceiver portion of said transceiver;

wherein said at least one transceiver and said biometric data transceiver portion of said transceiver determines, via authentication and validation, identification of said users and confirms if said users are wearing said user-wearable transaction secured devices via utilization of one or more computer driven communications processors that utilize one or more securitized containers;

wherein said computer driven communications processor provides, processes, and analyzes bio-identification, continuous bio-confirmation, and authentication of said users, and utilizes said securitized containers on an as needed basis, and wherein said authentication includes security authentication requests;

wherein transmissions sent or received by said at least one transceiver and said biometric data transceiver portion of said transceiver provide internal and external user identity validation for said user-wearable transaction secured devices that validate authentication via utilization of at least one distributed auto-synchronous array (DASA) database which provides a portion of data and a set of data rules necessary to validate transmissions transmitted and received between said user-wearable transaction secured devices for a specific, designated set of users of said user-wearable transaction secured devices.

2. The user-wearable transaction secured devices of claim 1, wherein said authentication includes either high or low security authentication requests and wherein said securitized containers are software containers.

3. The user-wearable transaction secured devices of claim 1, wherein said circuits are connected to sensors or said circuits themselves function as sensors.

4. The user-wearable transaction secured devices of claim 1, wherein said circuits are selected from a group consisting of: electronic, optical, and radiation emitting or receiving or both radiation emitting and receiving energized circuits that transmit and receive signals.

5. The user-wearable transaction secured devices of claim 1, wherein one or more display portions are communicatively coupled with said circuits.

6. The user-wearable transaction secured devices of claim 5, wherein said display portions display timepiece data and wherein said display portions can also display transaction data.

7. The user-wearable transaction secured devices of claim 1, wherein said housing is in a shape of a wristwatch, wherein said wristwatch incorporates features that provide functions for one or more devices selected from a group consisting of: a camera, a smartphone, a calculator, a global positioning system (GPS), a radio, a television, a door opener, a remote energy switching device, and a transceiver, wherein said transceiver is capable of acting as an (Internet Protocol) IP protocol data unit and wherein said housing is in a shape selected from a group consisting of: necklaces, broaches, rings, earrings, badges, belts, buckles, assorted jewelry, and articles of clothing.

8. The user-wearable transaction secured devices of claim 1, wherein said signals carry data that is transmitted and received by said at least one transceiver and wherein said at least one transceiver utilizes one or more securitized containers and analyzes and acts upon instructions contained within said data.

9. The user-wearable transaction secured devices of claim 1, wherein said sensors are biometric sensors that provide biometric data that contains information provided by one or more securitized containers and are used to confirm or deny access to said user-wearable transaction secured devices.

10. The user-wearable transaction secured devices of claim 1, wherein said bio-identification initiates a process that requires user action to bio-identify user-wearers of said user-wearable transaction secured devices followed by initial bio-confirmation and then authentication of said user-wearers to enable one or more transactions, wherein said transactions are provided by one or more securitized containers and wherein said bio-identification is continuously confirmed by authentication requests where if bio-confirmation is not confirmed, a de-authenticate procedure is initiated that utilizes one or more securitized containers and that requires bio-identification confirmation to be re-initiated.

11. The user-wearable transaction secured devices of claim 10, wherein said authentication requests are high security requests that require users actively re-bio-identify themselves in order for said authentication requests to proceed and where a test for bio-confirmation is maintained that results in a confirmation that allows for completion of authentication and wherein this authentication process utilizes one or more securitized containers and wherein said authentication requests are low security requests that do not require re-bio-identification, and where a test for bio-confirmation is maintained that results in a confirmation that allows for completion of authentication.

12. The user-wearable transaction secured devices of claim 11, wherein said authentication requests are communicated to said user-wearable transaction secured devices from external sources or said authentication requests are user initiated originating from said user-wearable transaction secured devices and wherein said users are notified when encryption is initiated, in process, or completed and wherein said notification utilizes one or more securitized containers.

13. The user-wearable transaction secured devices of claim 12, wherein said encryption is provided for transmissions during transmission of a credential identifier to control a server and utilizes one or more securitized containers.

14. The user-wearable transaction secured devices of claim 1, wherein said biometric data transceiver portion of said transceiver is configured to read information from one or more of a group consisting of: a user's fingerprints, voice patterns, a body's electrical, chemical, physical, and biological characteristics, biotags, facial characteristics, skin pH, thermal characteristics, ocular characteristics, kinesthetics, and genetic make-up and wherein said users includes any member of a genus in an animal or plant kingdom or both an animal and plant kingdom.

15. The user-wearable transaction secured devices of claim 1, wherein said power is obtained via a battery, a solar cell, and/or electromagnetic and/or radiative coupling from an external source.

16. The user-wearable transaction secured devices of claim 1, wherein transmissions sent or received by said at least one transceiver and said biometric data transceiver portion of said transceiver provide internal and external user identity validation for said user-wearable transaction secured devices that validate authentication via utilization of said (DASA) database(s), wherein said (DASA) database(s) contains and provides at least one authentication and encryption application and wherein said transmissions utilize one or more securitized containers.

17. The user-wearable transaction secured devices of claim 16, wherein said transmissions access and transmit a portion of data contained within said DASA database to said userwearable transaction secured devices, validates data transmitted from said user-wearable transaction secured devices with a portion of data within said DASA database, and further establishes validity of data according to a set of computational operations that provides a set of rules for data residing in said DASA database where all transmissions incoming to, held within, and outgoing from said sensors or any transceivers of said user-wearable transaction secured devices, function securely and singularly for a specific, designated set of users and wherein said transmissions utilize one or more securitized containers.

18. The user-wearable transaction secured devices of claim 16, wherein said authentication and encryption application is secured in a secured DASA database within a secured cloud or other secured storage device that utilizes said authentication and encryption application and utilizes one or more securitized containers.

19. The user-wearable transaction secured devices of claim 16, wherein said authentication and encryption application employs a step-wise process as follows:
    a user of one or more said user-wearable transaction secured devices invokes secured transmission as attempts to acquire a key using tolerance techniques that provide for a number of attempts to retrieve keys from a configuration table, wherein said authentication and encryption application possesses a get next key algorithm that is invoked locally on or in proximity to said user-wearable devices and wherein said authentication and encryption application utilizes one or more securitized containers.

20. The user-wearable transaction secured devices of claim 1, wherein said communications processor invokes use of at least one of the group of interfaces comprising a serial interface, a (Transmission Control Protocol Internet Protocol) TCP/IP interface, an (Institute of Electrical and Electronic Engineers) IEEE 802.11 interface, an IEEE 802.15.4 interface, and a secure (Hypertext Transfer Protocol) HTTP interface.

21. A system that employs one or more user-wearable transaction secured devices that utilize one or more securitized containers, these user-wearable transaction secured devices transmitting data to and receiving data from one or more user-wearable transaction secured devices to another comprising:
    said one or more user-wearable transaction secured devices that transmit data to and receive data from one or more said user-wearable transaction secured devices to another, further comprising: a housing; a computer driven communications processor containing a microprocessor and data storage encryption capacity fixedly mounted in said housing; one or more circuits fixedly mounted in said housing and communicatively coupled with said computer driven communications processor; a power source coupled with said circuits; at least one transceiver including a biometric data transceiver portion coupled with said housing and coupled with said circuits and with said computer driven communications processor where one or more sensors are held within or on one or more surfaces of said user-wearable transaction secured devices;
    wherein said user-wearable transaction secured devices transmit and receive encrypted signals from one or more said user-wearable transaction secured devices to another that form specific transmissions determined by one or more users, that utilize one or more securitized containers for said transmissions to said at least one transceiver and said biometric data transceiver portion of said transceiver;
    wherein said at least one transceiver and said biometric data transceiver portion of said transceiver determines, via authentication and validation, identification of said users and confirms if said users are wearing said user-wearable transaction secured devices via utilization of said computer driven communications processor that utilizes one or more securitized containers;

wherein said computer driven communications processor provides, processes, and analyzes bio-identification, continuous bio-confirmation, and authentication of said users, and utilizes said securitized containers on an as needed basis, and wherein said authentication includes security authentication requests;

wherein transmissions sent or received by said at least one transceiver and said biometric data transceiver portion of said transceiver provide internal and external user identity validation for said user-wearable transaction secured devices that validate authentication via utilization of at least one distributed auto-synchronous array (DASA) database which provides a portion of data and a set of data rules necessary to validate transmissions transmitted and received between said user-wearable transaction secured devices for a specific, designated set of users of said user-wearable transaction secured devices.

22. The system of claim 21, wherein said transmissions are accessing and transmitting a portion of data contained within said at least one DASA database to said user-wearable transaction secured devices, validating data transmitted from said user-wearable transaction secured devices with a portion of data held within said DASA database, and further establishing validity of data according to a set of rules for data residing in said DASA database where all transmissions incoming to, being held within, and outgoing from said circuits or any transceivers of said user-wearable transaction secured devices, are functioning in a secure manner for a specific, designated set of users.

23. The system of claim 21, wherein said DASA database is providing one or more transmissible, securitized, and encrypted codes, wherein said codes originate within an authentication and encryption application, and wherein said user-wearable transaction secured devices communicate internally and externally by transmission and reception of data signals that utilize said authentication and encryption application and wherein transceivers function as detecting devices that search, retrieve, and analyze a code generated after installation of said authentication and encryption application is complete.

24. The system of claim 23, wherein said codes are either recognizable or not recognizable by said user-wearable transaction secured devices during attempted authentication and validation and wherein said communications are enabled with Bluetooth technology and also enabled with infrared technology.

25. The system of claim 24, wherein said communications are disabled until said user's data is authenticated and validated or re-authenticated and revalidated or both authenticated, validated, and re-authenticated and revalidated.

26. The system of claim 21, wherein a transaction is a purchase, a command, or control of a switch or all three, a purchase, a command and a control of said switch, and wherein said transaction is selected from one or more of a group consisting of data, voice, and video transmissions that control hardware.

27. The system of claim 21, wherein said user's biometric data is electronically stored within one or more memory storage systems selected from any one or more of a group consisting of: memory chips, internal or external servers, and a cloud data storage medium, that exist internally to or externally from said devices.

* * * * *